US012719206B2

(12) United States Patent
Masuda et al.

(10) Patent No.: US 12,719,206 B2
(45) Date of Patent: Aug. 25, 2026

(54) WATERPROOF CONNECTOR

(71) Applicant: YAZAKI CORPORATION, Tokyo (JP)

(72) Inventors: Satoki Masuda, Makinohara (JP); Yoshinao Sato, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 344 days.

(21) Appl. No.: 18/646,760

(22) Filed: Apr. 26, 2024

(65) Prior Publication Data

US 2024/0396257 A1 Nov. 28, 2024

(30) Foreign Application Priority Data

May 24, 2023 (JP) ................................ 2023-085557

(51) Int. Cl.
*H01R 13/52* (2006.01)

(52) U.S. Cl.
CPC ................................ *H01R 13/5202* (2013.01)

(58) Field of Classification Search
CPC .................................................. H01R 13/5202
See application file for complete search history.

(56) References Cited

U.S. PATENT DOCUMENTS 12,562,523 B2 * 2/2026 Tanaka ............... H01R 13/5202
2022/0158384 A1 5/2022 Masuda et al.

FOREIGN PATENT DOCUMENTS

JP 2022-107498 A 7/2022

* cited by examiner

*Primary Examiner* — Neil Abrams
(74) *Attorney, Agent, or Firm* — KENEALY VAIDYA LLP

(57) ABSTRACT

There is provided a waterproof connector including: a housing configured to accommodate a terminal; an annular packing attached to an outer periphery of the housing and configured to seal between the housing and an opening of a counterpart member; and a front holder attached to a tip side of the housing and positioning the packing. The packing and the front holder are mounted on a fitting portion of the housing, the fitting portion being to be inserted into the opening of the counterpart member. The front holder has a locking portion configured to engage with an outer periphery of the fitting portion of the housing.

3 Claims, 5 Drawing Sheets

WATERPROOF CONNECTOR

CROSS-REFERENCE TO RELATED APPLICATIONS

This application is based on and claims priority under 35 USC 119 from Japanese Patent Application No. 2023-085557 filed on May 24, 2023, the contents of which are incorporated herein by reference.

TECHNICAL FIELD

The present disclosure relates to a waterproof connector.

BACKGROUND ART

JP2022-107498A discloses a waterproof connector including a housing in which a first packing and a second packing for sealing with an attachment hole of a casing are mounted on a fitting portion to be fitted into the attachment hole.

In this waterproof connector, a front holder for regulating separation of the second packing is attached to a front end portion of the fitting portion of the housing.

However, since the above waterproof connector has a structure in which the front holder is attached by being engaged with a front surface of the fitting portion of the housing, the front holder may be detached from the housing even in a state in which the fitting portion is inserted into the attachment hole of the casing. When the front holder is detached from the housing, a position of the packing cannot be regulated by the front holder, and the packing may fall off to cause a decrease in sealing performance.

SUMMARY OF INVENTION

The present disclosure provides a waterproof connector capable of maintaining a good sealing performance in a state of being inserted into an attachment hole while ensuring a good assembling performance of a front holder to a housing.

The above object of the present disclosure is achieved by the following configuration.

According to an illustrative aspect of the present disclosure, a waterproof connector includes: a housing configured to accommodate a terminal; an annular packing attached to an outer periphery of the housing and configured to seal between the housing and an opening of a counterpart member; and a front holder attached to a tip side of the housing and positioning the packing. The packing and the front holder are mounted on a fitting portion of the housing, the fitting portion being to be inserted into the opening of the counterpart member. The front holder has a locking portion configured to engage with an outer periphery of the fitting portion of the housing.

The present disclosure has been briefly described above. Further, details of the present disclosure can be clarified by reading modes (hereinafter, referred to as "embodiments") for carrying out the disclosure to be described below with reference to the accompanying drawings.

DESCRIPTION OF EMBODIMENTS

A specific embodiment of the present disclosure will be described below with reference to the drawings.

Figure 1:
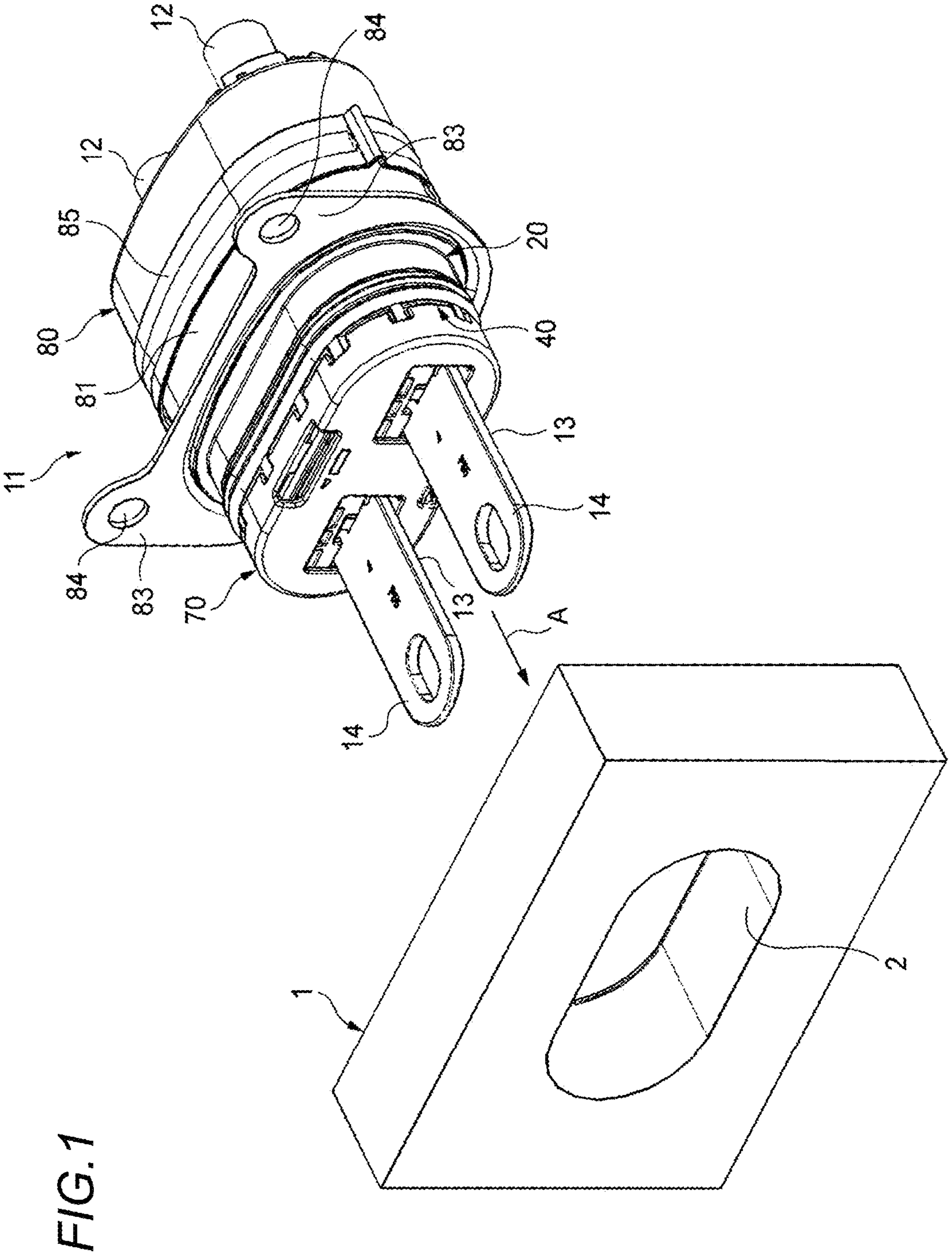
FIG. 1 is a perspective view of a waterproof connector according to an embodiment, which is to be attached to a casing.
Figure 2:
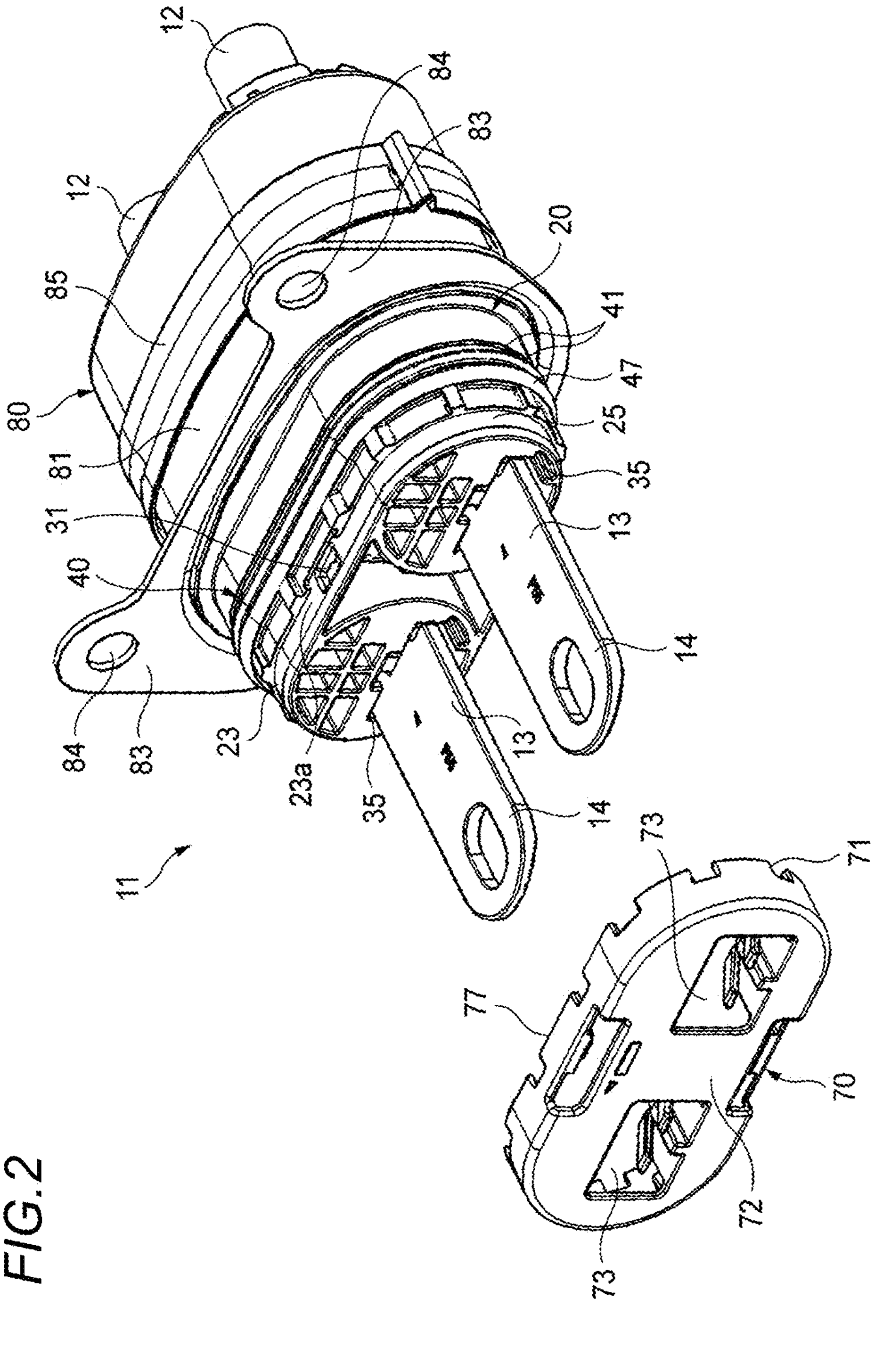
FIG. 2 is a perspective view of the waterproof connector with a front holder removed.
Figure 3:
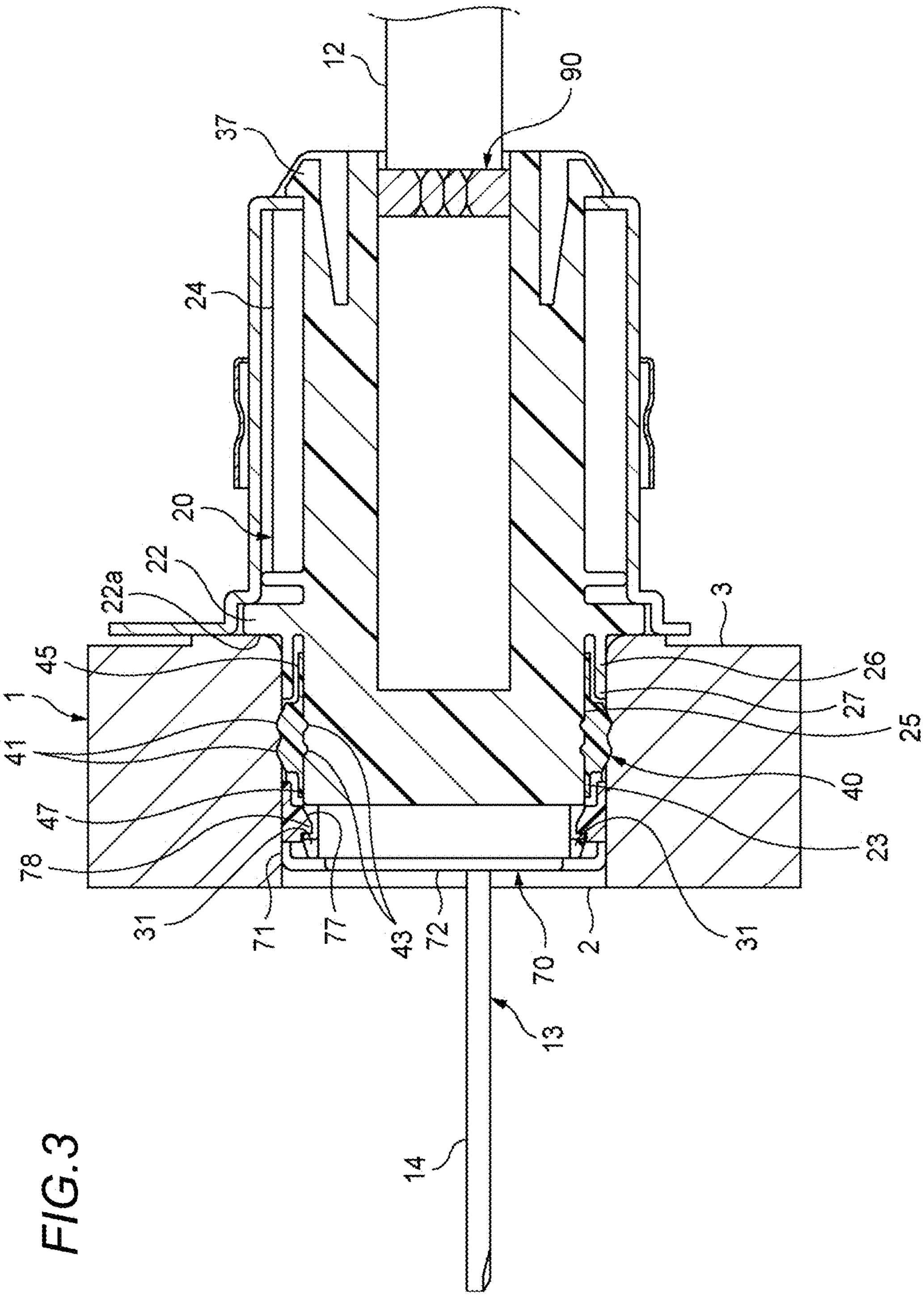
FIG. 3 is a longitudinal cross-sectional view taken along an insertion direction of the waterproof connector according to the present embodiment, which is attached to the casing.

FIG. 1 is a perspective view of a waterproof connector according to an embodiment, which is to be attached to a casing. FIG. 2 is a perspective view of the waterproof connector with a front holder removed. FIG. 3 is a longitudinal cross-sectional view taken along an insertion direction of the waterproof connector according to the present embodiment, which is attached to the casing.

A waterproof connector 11 according to the present embodiment is, for example, a waterproof connector used for direct attachment of vehicle-mounted electric devices of an electric vehicle or a hybrid vehicle (hereinafter, referred to simply as "devices") when a battery, an inverter, and the like that are the devices are electrically connected. A motor mounted on the hybrid vehicle or the electric vehicle is supplied with a large current from the battery via the inverter so as to be able to exert a high driving torque. Generally, as electric wires 12 connecting the battery and the inverter, in order to reduce transmission loss, a large-diameter electric wire (thick electric wire) having a large conductor diameter and whose conductor periphery is covered with an insulating sheath having high insulation performance is used. The waterproof connector 11 is suitable for use in a structure in which the large-diameter electric wire 12 is directly attached to an attachment hole (an opening) 2 provided in a casing 1 of the device (a counterpart member). In the present embodiment, a fitting direction A of the waterproof connector 11 with respect to the attachment hole 2 is defined as a forward direction of the connector, and a removal direction is defined as a backward direction of the connector.

As shown in FIGS. 1 to 3, the waterproof connector 11 according to the present embodiment includes a housing 20, a packing 40, and a front holder 70 as main components. In addition, the waterproof connector 11 includes terminals 13 connected to respective end portions of the electric wires 12, a shield shell 80, and a rear holder 90. Further, although not shown, the waterproof connector 11 includes a rubber plug and a braided wire.

The casing 1 may be, for example, a casing (such as a metal case) of the inverter mounted on the electric vehicle, the hybrid vehicle, or the like. The casing 1 is a casing as a counterpart member made of a conductive metal. The casing 1 has the attachment hole 2 into which the waterproof connector 11 is to be inserted. The waterproof connector 11 is attached to the casing 1 from a connector attachment surface 3 side of an outer surface of the casing 1. The counterpart member according to the present disclosure is not limited to the casing, and can be applied to various counterpart members such as a counterpart connector into which the waterproof connector 11 is to be fitted.

The housing 20 is made of an electrically insulating synthetic resin and formed in an elongated cylindrical shape. The housing 20 includes a flange portion 22 that protrudes from a substantially intermediate portion in the fitting direction A, a fitting portion 23 that is provided in front of the flange portion 22 and is to be fitted into the attachment hole 2 of the casing 1, and a mounting portion 24 that is provided behind the flange portion 22 and on which the shield shell 80 is mounted.

In the flange portion 22, a front side surface 22a orthogonal to the fitting direction A comes into contact with a connector attachment surface 3 of the casing 1, so that the fitting portion 23 can regulate an insertion position of the housing 20 fitted into the attachment hole 2 of the casing 1.

The fitting portion 23 is formed in an elongated circular shape in a front view, and an outer peripheral surface thereof serves as a packing attachment surface 25. The fitting portion 23 is provided with a packing engagement piece 26 extending from the flange portion 22 in the fitting direction A. The packing engagement piece 26 is provided with a gap 27 from the packing attachment surface 25.

The fitting portion 23 has locking holes 31. The locking holes 31 are respectively formed in long side portions 23a of the fitting portion 23. The locking holes 31 are respectively formed at positions in the vicinity of a tip of the fitting portion 23 and at center positions of the fitting portion 23 in a width direction.

Locking arms 37 for holding the shield shell 80 by locking a rear end of the shield shell 80 are provided at upper and lower portions of a rear end of the mounting portion 24. The rear holder 90 is assembled to the mounting portion 24 from the rear portion thereof. The rear holder 90 prevents bending of the electric wire 12 and prevents the rubber plug externally fitted to the electric wire 12 from coming off and falling.

The housing 20 has a plurality of (two in the present embodiment) terminal accommodating chambers (not shown), and the terminals 13 connected to the end portions of the electric wires 12 are respectively mounted on the terminal accommodating chambers. The terminals 13 are inserted into the terminal accommodating chambers from the rear of the housing 20 and protrude to the front of the housing 20. The electric wires 12 to which the terminals 13 are connected are led out from the rear of the housing 20. The terminal 13 has an electrical connection portion 14 formed in a plate shape, and the electrical connection portion 14 protrudes to a front side of the housing 20 from an insertion hole 35 formed in a front end surface of the housing 20. A hole (not shown) is formed in the electrical connection portion 14, and the terminal 13 is prevented from coming off from the terminal accommodating chamber by locking a lance (not shown) formed in the terminal accommodating chamber to the hole of the electrical connection portion 14.

The packing 40 is made of an elastic material such as rubber and has an oval ring shape. The packing 40 is mounted on the fitting portion 23 of the housing 20, and seals between the fitting portion 23 of the housing 20 and the attachment hole 2 of the casing 1. An outer lip 41 that is brought into close contact with an inner peripheral surface of the attachment hole 2 is provided on an outer peripheral surface of the packing 40, and an inner lip 43 that is in close contact with the packing attachment surface 25 of the fitting portion 23 is provided on an inner peripheral surface of the packing 40.

The packing 40 is formed with anti-turning-up pieces 45 and 47 protruding toward an attachment side to the fitting portion 23 of the housing 20 and a side opposite to the attachment side, respectively. The anti-turning-up pieces 45 and 47 are formed over the entire periphery of the packing 40. The packing 40 is mounted on the fitting portion 23 of the housing 20 to come into contact with the packing engagement piece 26 and is positioned in the housing 20. In a state where the packing 40 is mounted on the fitting portion 23 of the housing 20, the anti-turning-up piece 45 on the attachment side is inserted into the gap 27 between the packing attachment surface 25 and the packing engagement piece 26. Accordingly, the packing 40 is prevented from being turned up on the attachment side to the fitting portion 23.

Figure 4:
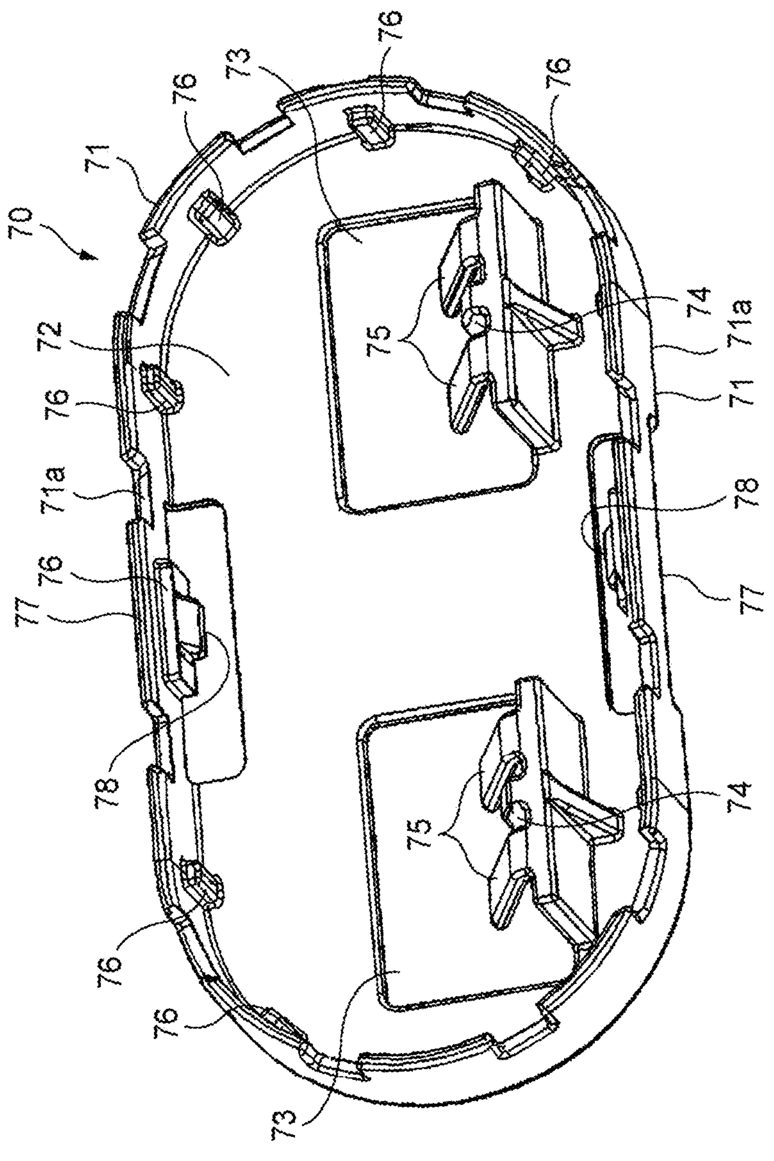
FIG. 4 is a perspective view of the front holder viewed from a side where the front holder is attached to a housing.
Figure 5:
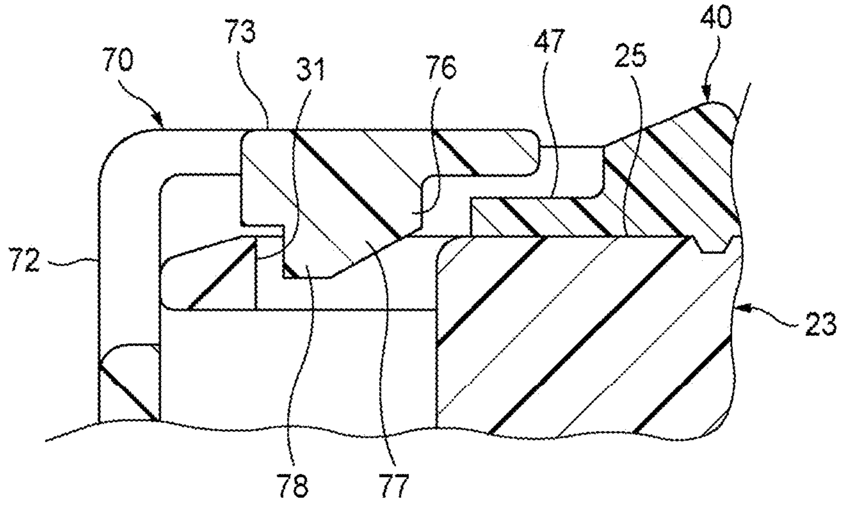
FIG. 5 is a longitudinal cross-sectional view of an engagement portion between a locking hole of the housing and a locking portion of the front holder.
Figure 6:
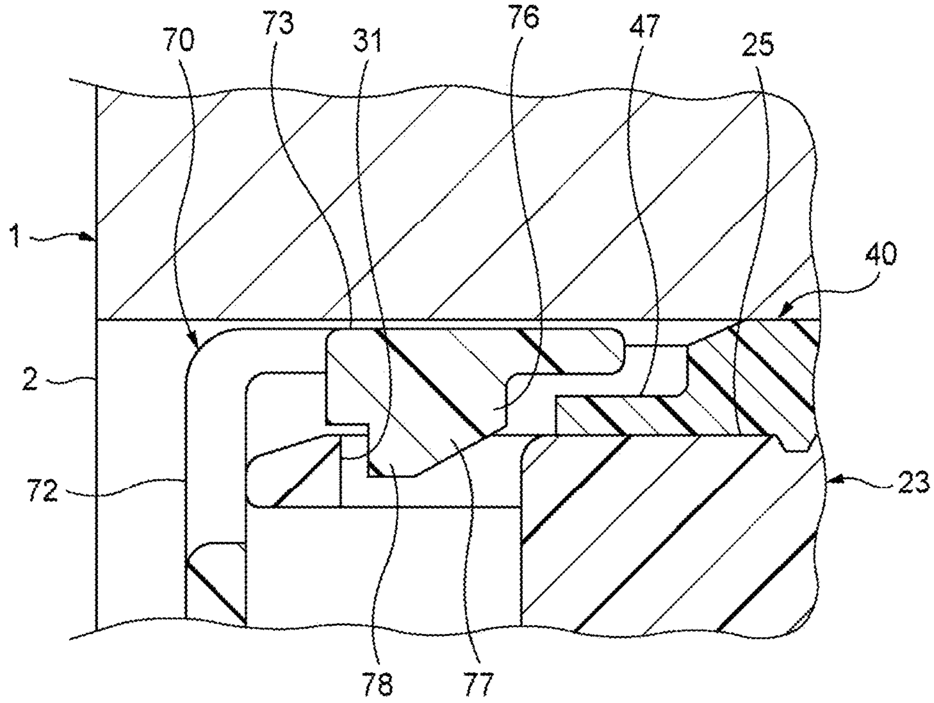
FIG. 6 is a cross-sectional view of the engagement portion between the locking hole of the housing and the locking portion of the front holder in the waterproof connector in which a fitting portion is fitted into an attachment hole.

FIG. 4 is a perspective view of the front holder viewed from a side where the front holder is attached to the housing. FIG. 5 is a longitudinal cross-sectional view of an engagement portion between the locking hole of the housing and a locking portion of the front holder. FIG. 6 is a cross-sectional view of the engagement portion between the locking hole of the housing and the locking portion of the front holder in the waterproof connector in which the fitting portion is fitted into the attachment hole.

As shown in FIG. 4, the front holder 70 includes an annular portion 71 having an oval ring shape, and a front wall portion 72 having an elongated circular plate shape and provided on a front end side of the annular portion 71 in the fitting direction A. The front holder 70 is made of an electrically insulating synthetic resin and is attached to a front end portion of the fitting portion 23 of the housing 20. The front holder 70 is fitted into the fitting portion 23 of the housing 20 with the annular portion 71 facing the housing 20. Accordingly, in the front holder 70, the front wall portion 72 is disposed along a front end surface of the fitting portion 23 of the housing 20, and the annular portion 71 is disposed in a manner of covering an outer peripheral side at the tip of the fitting portion 23 of the housing 20. When the front holder 70 is attached to the front end portion of the fitting portion 23 of the housing 20, a position of the packing 40 mounted on the fitting portion 23 is regulated, and separation from the fitting portion 23 is regulated.

The front wall portion 72 is formed with terminal insertion openings 73 through which the electrical connection portions 14 of the terminals 13 are inserted, respectively. An engagement projection 74 and a pair of flexible pieces 75 are provided on a lower edge portion of each of the terminal insertion openings 73 of the front wall portion 72 and on a mounting side to the housing 20. The engagement projection 74 locks the hole portion formed in the electrical connection portion 14 of the terminal 13, and double locks the terminal 13 together with the lance of the housing 20. The pair of flexible pieces 75 are in elastic contact with the electrical connection portion 14 of the terminal 13 to prevent rattling of the terminal 13.

The front holder 70 has a plurality of contact portions 76 on a front wall portion 72 side on an inner peripheral portion of the annular portion 71. The contact portions 76 are arranged at intervals in a circumferential direction of the front holder 70. The contact portion 76 comes into contact with the packing 40 mounted on the fitting portion 23, by attaching the front holder 70 to the fitting portion 23 of the housing 20. Accordingly, the packing 40 is prevented from coming off from the fitting portion 23 of the housing 20. In addition, by attaching the front holder 70 to the fitting portion 23 of the housing 20, an outer peripheral side of the anti-turning-up piece 47 on the side opposite to the attachment side of the packing 40 is covered with the annular portion 71 of the front holder 70. Accordingly, the packing

40 is prevented from being turned up on the side opposite to the attachment side to the fitting portion 23.

The front holder 70 has locking portions 77. The locking portions 77 are respectively formed on long side portions 71*a* of the annular portion 71 of the front holder 70 and at center positions of the front holder 70 in a width direction. Each of the locking portions 77 has a claw portion 78 protruding toward the inside of the front holder 70.

As shown in FIG. 5, the claw portion 78 of the locking portion 77 engages with the locking hole 31 formed in the fitting portion 23 of the housing 20 from an outer peripheral side, by attaching the front holder 70 to the fitting portion 23 of the housing 20. Accordingly, the front holder 70 is maintained in a state of being attached to the fitting portion 23 of the housing 20.

The shield shell 80 is made of a conductive metal. The shield shell 80 integrally covers an outer peripheral surface of the mounting portion 24 of the housing 20 with a tubular shell body 81. The shield shell 80 is formed with a pair of bolt fixing portions 83 to be fixed to the casing 1. A bolt insertion hole 84 is formed in the bolt fixing portion 83.

The shield shell 80 is fastened to the casing 1 by a bolt in a state where an end of a tubular braided wire (not shown) covering the two electric wires 12 is connected to the shell body 81 by a metal tie 85. Accordingly, the shield shell 80 forms a shield circuit and has a structure that shields noise. The housing 20 is fastened to the casing 1 by the bolt via the shield shell 80. A waterproof boot (not shown) is mounted on the shell body 81 of the shield shell 80 from the outside of the braided wire, and the waterproof boot covers a fixing portion between the shield shell 80 and the end of the braided wire to provide waterproofing.

The waterproof connector 11 is attached to the casing 1 by fitting the fitting portion 23 of the housing 20 into the attachment hole 2 of the casing 1 and fastening the shield shell 80 to the casing 1 by the bolt. In this attached state, the outer lip 41 of the packing 40 assembled to the fitting portion 23 of the waterproof connector 11 is brought into close contact with the inner peripheral surface of the attachment hole 2. Accordingly, the packing 40 seals between the fitting portion 23 of the housing 20 and the attachment hole 2 of the casing 1.

The waterproof connector 11 has a structure in which the locking portion 77 of the front holder 70 engages with an outer periphery of the fitting portion 23 of the housing 20. Therefore, as shown in FIG. 6, when the fitting portion 23 of the housing 20 is fitted into the attachment hole 2 of the casing 1, an engagement portion of the front holder 70 with the housing 20 is inserted into and covered by the attachment hole 2. Accordingly, in a state where the fitting portion 23 of the housing 20 is inserted into the attachment hole 2, the engagement with the housing 20 by the locking portion 77 of the front holder 70 is released and the front holder 70 is not detached.

That is, the waterproof connector 11 according to the present embodiment has a structure in which the engagement portion of the front holder 70 with the housing 20 is inserted into and covered by the attachment hole 2, and thus in the state where the fitting portion 23 of the housing 20 is inserted into the attachment hole 2, the packing 40 can be prevented from falling off due to the detaching of the front holder 70. Accordingly, it is possible to maintain a good sealing performance by the packing 40.

The front holder 70 can be easily attached to the fitting portion 23 of the housing 20 since there is a structure in which the claw portion 78 of the locking portion 77 of the front holder 70 engages with the locking hole 31 of the fitting portion 23 by assembling the front holder 70 to the fitting portion 23 of the housing 20.

In addition, by assembling the front holder 70 to the fitting portion 23 of the housing 20, the anti-turning-up piece 47 of the packing 40 is covered with the annular portion 71 of the front holder 70, thereby preventing the packing 40 from turning up. Accordingly, the fitting portion 23 of the housing 20 can be smoothly inserted into the attachment hole 2, and the good sealing performance by the packing 40 can be ensured.

The present disclosure is not limited to the embodiment described above, and can be appropriately modified, improved, or the like. In addition, materials, shapes, sizes, numbers, arrangement positions, and the like of components in the embodiment described above are freely selected and are not limited as long as the present disclosure can be implemented.

Here, features of the waterproof connector according to the embodiment of the present disclosure described above are briefly summarized and listed in the following aspects 1 to 3.

According to an aspect 1 of the present disclosure, a waterproof connector (11) includes: a housing (20) accommodating a terminal (13); an annular packing (40) attached to an outer periphery of the housing (20) and configured to seal between the housing and an opening of a counterpart member (attachment hole 2); and a front holder (70) attached to a tip side of the housing (20) and positioning the packing (40). The packing (40) and the front holder (70) are mounted on a fitting portion (23) of the housing (20), the fitting portion (23) being to be inserted into the opening of the counterpart member (attachment hole 2). The front holder (70) has a locking portion (77) configured to engage with an outer periphery of the fitting portion (23) of the housing (20).

According to the waterproof connector having a configuration of the above aspect 1, there is a structure in which the locking portion of the front holder engages with the outer periphery of the fitting portion of the housing. That is, since there is a structure in which an engagement portion of the front holder with the housing is inserted into and covered by the opening of the counterpart member, in a state where the fitting portion of the housing is inserted into the opening of a counterpart member, the engagement with the housing by the locking portion of the front holder is released and the front holder is not detached. Therefore, the packing can be prevented from falling off due to the detaching of the front holder, and a good sealing performance by the packing can be maintained.

According to an aspect 2 of the present disclosure, in the waterproof connector according to the above aspect 1, the fitting portion (23) of the housing (20) has a locking hole (31) provided on the outer periphery of the fitting portion. The locking portion (77) of the front holder (70) has a claw portion (78) configured to engage with the locking hole (31).

According to the waterproof connector having a configuration of the above aspect 2, the claw portion of the locking portion of the front holder engages with the locking hole of the fitting portion by assembling the front holder to the fitting portion of the housing. Accordingly, the front holder can be easily attached to the fitting portion of the housing.

According to an aspect 3 of the present disclosure, in the waterproof connector according to the above aspect 1 or 2, at least a part of an outer periphery of the packing (40) is covered with the front holder (70).

According to the waterproof connector having a configuration of the above aspect 3, at least a part of the outer periphery of the packing is covered with the front holder, and thus the packing is prevented from turning up. Accordingly, the fitting portion of the housing can be smoothly inserted into the opening of the counterpart member, and the good sealing performance by the packing can be ensured.

According to the present disclosure, it is possible to provide a waterproof connector capable of maintaining a good sealing performance in a state of being inserted into an attachment hole while ensuring a good assembling performance of a front holder to a housing.

What is claimed is:

1. A waterproof connector, comprising:

a housing configured to accommodate a terminal;

an annular packing attached to an outer periphery of the housing and configured to seal between the housing and an opening of a counterpart member; and a front holder attached to a tip side of the housing and positioning the packing, wherein the packing and the front holder are mounted on a fitting portion of the housing, the fitting portion being to be inserted into the opening of the counterpart member, and the front holder has a locking portion configured to engage with an outer periphery of the fitting portion of the housing.

2. The waterproof connector according to claim 1, wherein the fitting portion of the housing has a locking hole provided on the outer periphery of the fitting portion, and the locking portion of the front holder has a claw portion configured to engage with the locking hole.

3. The waterproof connector according to claim 1, wherein at least a part of an outer periphery of the packing is covered with the front holder.

* * * * *